United States Patent [19]
Zoiss et al.

[11] Patent Number: 5,872,831
[45] Date of Patent: Feb. 16, 1999

[54] VARIABLE GEOMETRY BATTERY COMPARTMENT FOR ACCOMMODATING DIFFERENT SIZED BATTERIES IN TELEPHONE CRAFTSPERSON'S TEST SET

[75] Inventors: Edward J. Zoiss, Moorpark; Kenneth Sterling, Thousand Oaks; Roy L. Soto, Moorpark; Kurt Foulger, Newbury Park; Dennis Ackmann, Thousand Oaks, all of Calif.

[73] Assignee: Harris Corporation, Melbourne, Fla.

[21] Appl. No.: 754,076

[22] Filed: Nov. 20, 1996

[51] Int. Cl.⁶ .............................. H04M 1/24; H04M 3/08; H04M 3/22
[52] U.S. Cl. ................................. 379/21; 429/100; 429/99
[58] Field of Search ..................... 379/428, 433, 379/434, 21; 381/322, 324, 325, 327, 328; 136/230; 429/175, 176, 9, 99, 100, 123, 177; 324/73.1, 723, 511, 522

[56] References Cited

U.S. PATENT DOCUMENTS

| | | | |
|---|---|---|---|
| 4,032,707 | 6/1977 | Trenary | 429/100 |
| 4,037,026 | 7/1977 | Mabuchi | 429/100 |
| 4,057,677 | 11/1977 | Mabuchi | 429/100 |
| 4,853,302 | 8/1989 | Yamanaka et al. | 429/100 |
| 4,863,812 | 9/1989 | Ueda et al. | 429/100 |
| 5,157,318 | 10/1992 | Wang | 320/2 |
| 5,316,873 | 5/1994 | Scrivano | 429/100 |
| 5,384,207 | 1/1995 | Ohtani | 429/9 |
| 5,607,322 | 3/1997 | Schaub | 439/500 |
| 5,654,870 | 8/1997 | Havener | 361/600 |
| 5,686,811 | 11/1997 | Bushong et al. | 320/2 |

FOREIGN PATENT DOCUMENTS

| | | |
|---|---|---|
| 2 268 827 | 1/1994 | United Kingdom . |
| 2 284 924 | 6/1995 | United Kingdom . |

*Primary Examiner*—Curtis A. Kuntz
*Assistant Examiner*—Rexford N. Barnie
*Attorney, Agent, or Firm*—Charles E. Wands

[57] ABSTRACT

A variable geometry battery compartment of an electronic communication device, such as a telephone test set, is readily reconfigurable by the user, so that different sized batteries can be used to power the circuitry of the device. For this purpose, a moveable battery contact wall is repositionable between spaced apart locations relative to a fixed battery contact wall. A charging switch controls the establishment of a charging path for rechargeable batteries, and can only be engaged when the moveable wall is positioned to accommodate longer sized rechargeable batteries. Changing the position of the moveable battery contact wall to accommodate shorter, non-rechargeable batteries, will prevent the charging switch from being engaged by an activating boss in a cover of the device, so that shorter non-rechargeable batteries cannot be placed in circuit with a battery charger.

4 Claims, 5 Drawing Sheets

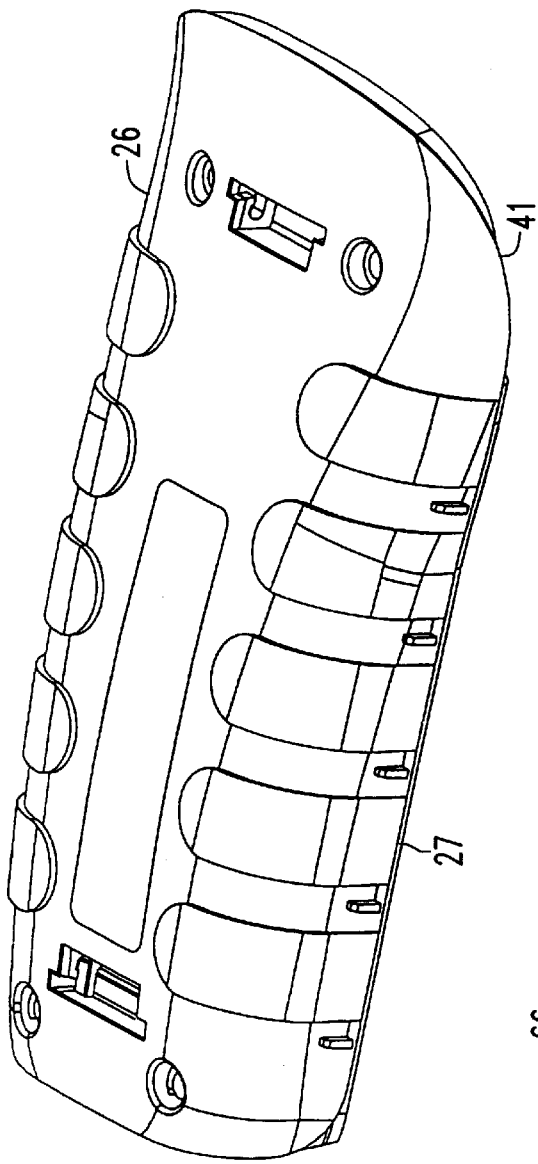
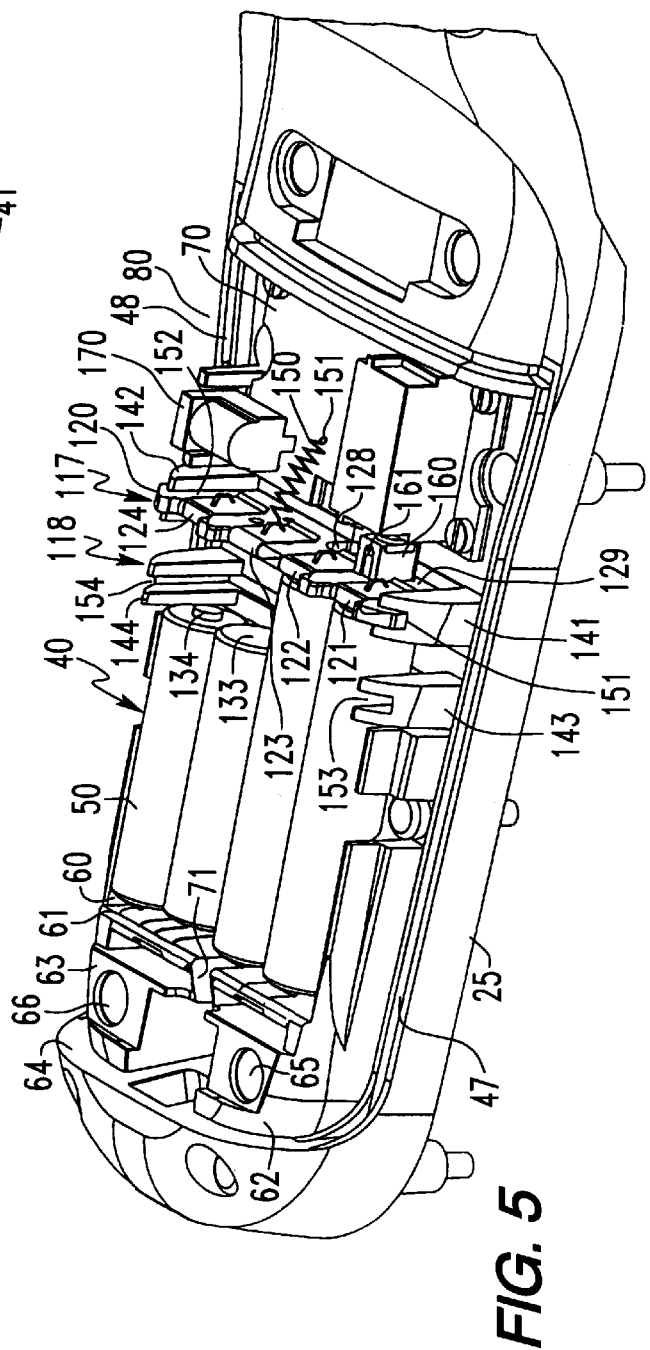
FIG. 4
FIG. 5

VARIABLE GEOMETRY BATTERY COMPARTMENT FOR ACCOMMODATING DIFFERENT SIZED BATTERIES IN TELEPHONE CRAFTSPERSON'S TEST SET

FIELD OF THE INVENTION

The present invention relates in general to portable communication devices, such as a telephone craftsperson's test set, and is particularly directed to a variable geometry battery compartment for such devices, that is readily reconfigurable by the user so as to accommodate different sized batteries for powering circuitry of the device.

BACKGROUND OF THE INVENTION

Electrical and electronic utility devices, including but not limited to portable communication devices, such as telephone craftsperson's test sets, radios, cassette and CD players, and the like, are typically configured to be powered from alternative DC power sources—in particular, batteries installed in an internal battery compartment, or by means of an internal AC-DC converter (rectifier and voltage scaling circuit) that is plugged into a local (110 VAC) outlet. If the device is equipped to use rechargeable batteries (as is customarily the case), such batteries may be charged by connecting a DC charging port of the device to a battery charging unit plugged into a (110 VAC) power outlet.

Typically, a device's battery compartment is configured to accept batteries of only a particular size, such as D, C, A, AA, or AAA type batteries, dictated by the power requirements of the device. Where the device is designed for use with increased storage capacity rechargeable batteries (e.g., 1½ AA NiCad batteries), that are sized differently from (longer than) conventional non-rechargeable (e.g., AA alkaline) batteries, the battery compartment of the device will be sized correspondingly to accept only such longer rechargeable batteries. As a consequence, as such rechargeable batteries become depleted, they must be replaced by like sized rechargeable batteries, since conventional non-rechargeable batteries of the same voltage, but lesser capacity, won't fit.

This creates a frustrating situation to the user, particularly where utilization of the device may be relatively short term, and readily available non-rechargeable batteries would do the trick—if only they would fit in the battery compartment. An example of this problem is the need for an abbreviated use of a telephone test set in the course of a craftsperson servicing a subscriber line circuit. If the rechargeable batteries go dead in the field, the test set cannot be used until the batteries are recharged.

SUMMARY OF THE INVENTION

In accordance with the present invention, the above problem is successfully addressed by a variable geometry battery compartment, such as may employed in a variety of communication devices, such as a telephone craftsperson's test set. This variable geometry battery compartment is mechanically adjustable or reconfigurable by the user, so that different sized batteries may be used to power the circuitry of the test set. Pursuant to the invention, the battery compartment contains a fixed battery contact wall disposed at a first location of the test set and having a first plurality of battery contacts that are arranged to engage first terminals of a plurality of same sized batteries.

The battery compartment also includes a moveable battery contact wall, which is selectively positionable at different locations in the test set that are spaced apart from the fixed wall by respectively different distances associated with dimensions of different sized batteries, such as a longer 1½ AA rechargeable NiCad battery and a comparable power, but non-rechargeable AA alkaline battery. The moveable wall contains a second plurality of battery contacts arranged to engage second terminals of the batteries. A power connection to the internal circuitry of the test set is provided by way of a flexible conductor connected between the second plurality of battery contacts of the moveable wall and a printed circuit board adjacent to the battery compartment. This flexible conductor accommodates the different locations in the battery compartment at which the moveable wall may be positioned.

A charging switch is attached to the moveable wall and serves to control the establishment of a charging path for rechargeable batteries. For this purpose, when the moveable wall is positioned to accommodate longer sized rechargeable batteries, the charging switch will be engaged by a boss on the test set's cover. Changing the position of the moveable wall to accommodate shorter, non-rechargeable batteries, will relocate the charging switch so that it cannot be engaged by the boss, thereby preventing the shorter non-rechargeable batteries from being placed in circuit with the battery charger.

BRIEF DESCRIPTION OF THE DRAWINGS

FIG. 4 is a perspective view of the battery door of the test set of FIGS. 1–3;

FIG. 5 is partial perspective view showing the battery compartment portion of a main housing section of the test set of FIGS. 1–4;

DETAILED DESCRIPTION

FIGS. 1–7 diagrammatically illustrate a telephone craftsperson's test set generally configured as described and illustrated in the above-referenced applications, and having a battery compartment that is configured to incorporate the variable geometry battery compartment of the present invention. It should be observed, however, that the invention is not limited to use with only a craftsperson's test set or one configured as detailed in the above-referenced copending applications, but may be installed in other types of electrical and electronic utility devices, including but not restricted to those mentioned previously.

Figure 1:
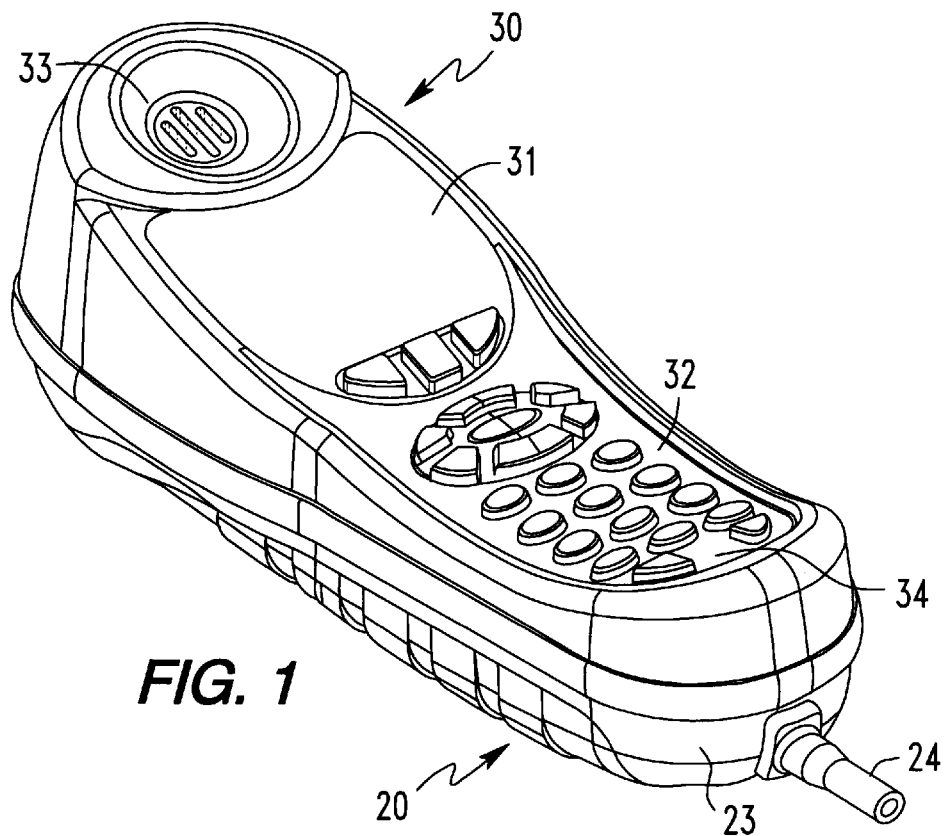
FIG. 1 is a perspective view showing the keypad face of a telephone craftsperson's test set described and illustrated in the above-referenced applications.
Figure 2:
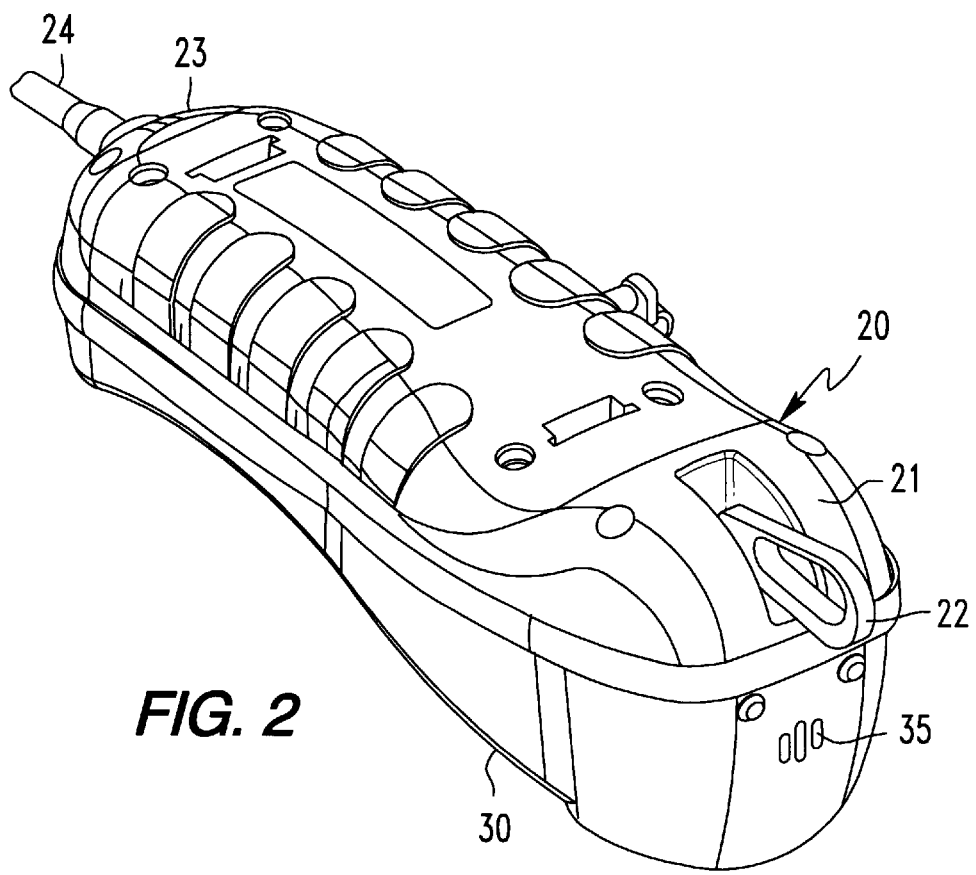
FIG. 2 is a perspective view showing the battery cover portion of the test set of FIG. 1.
Figure 3:
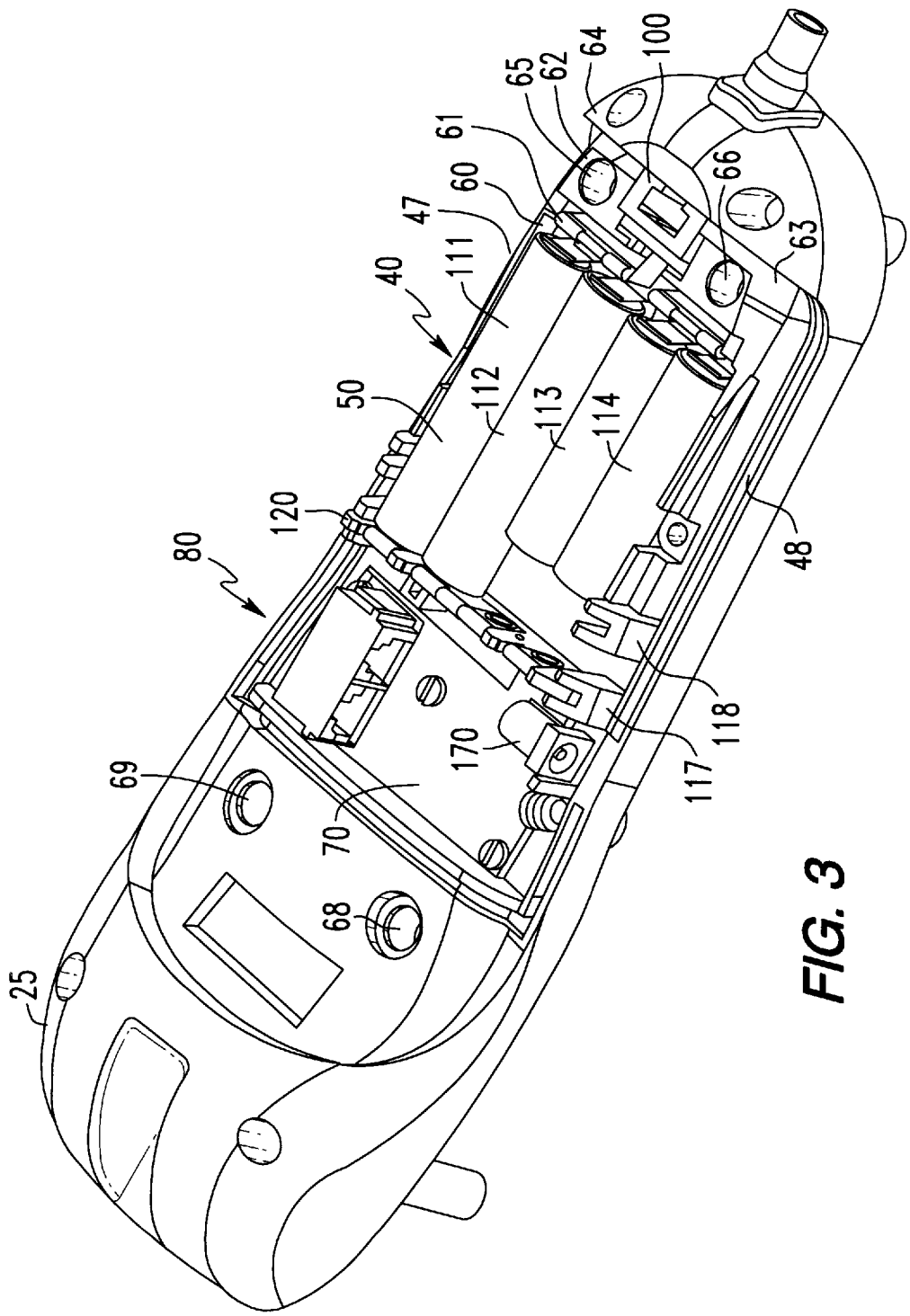
FIG. 3 is a perspective view showing the battery compartment portion of a main housing section of the test set of FIGS. 1 and 2.
Figure 6:
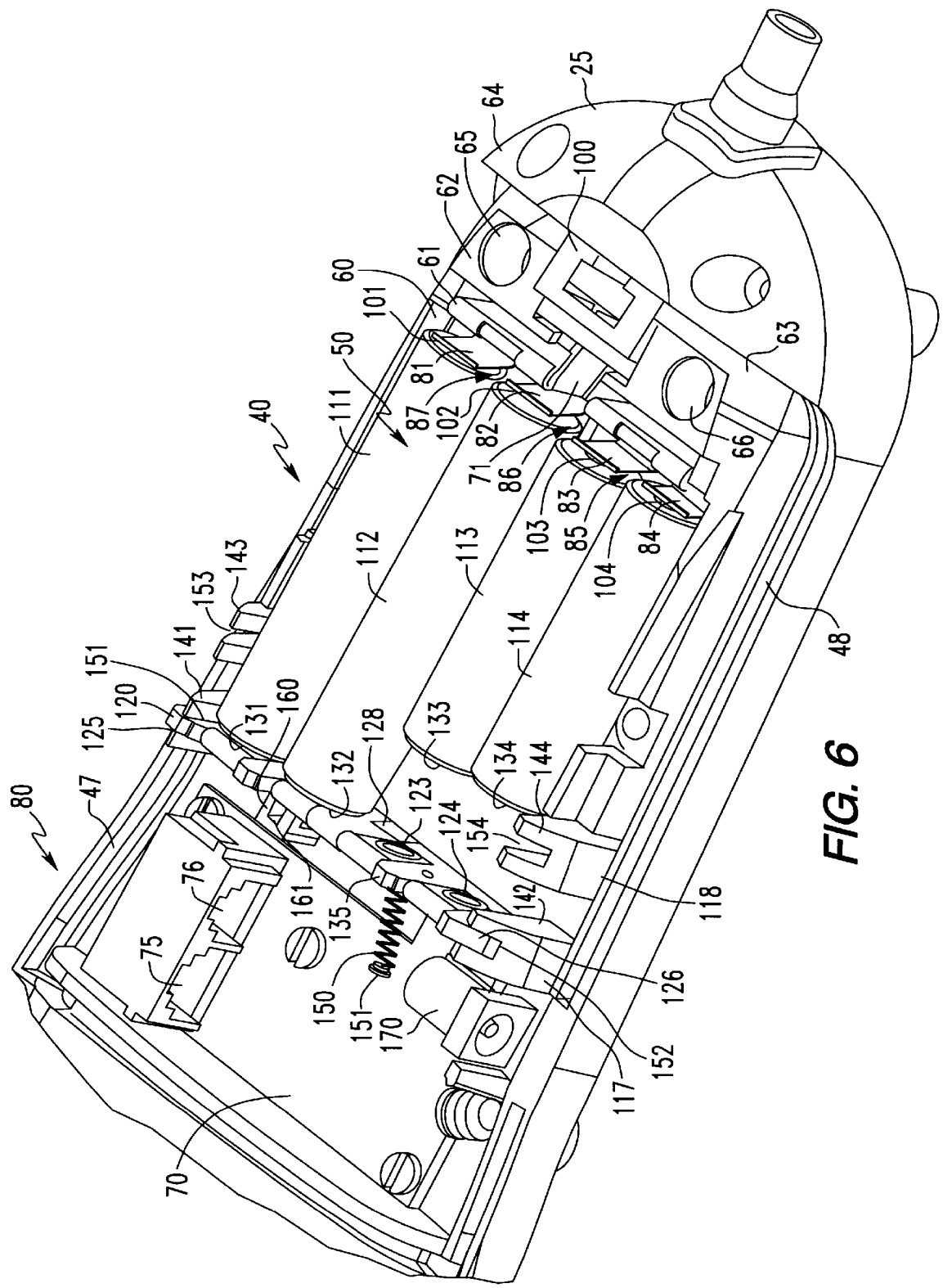
FIG. 6 is an enlarged partial perspective view of FIG. 3.
Figure 7:
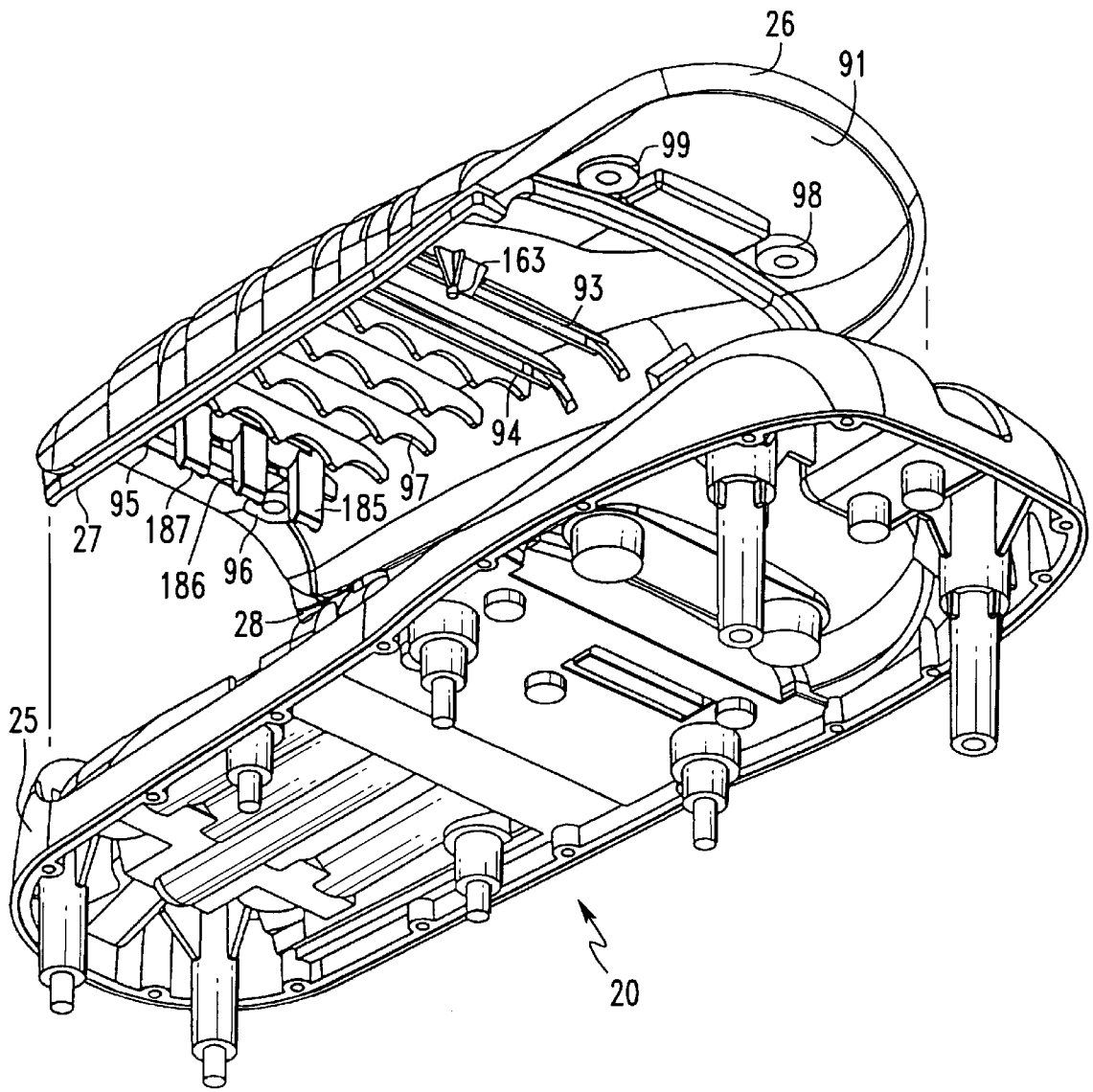
FIG. 7 is a perspective view showing the interior surfaces of the battery door and the battery compartment portion of a multi-section rear housing portion of the test set of FIGS. 1–6.

Of FIGS. 1–7, FIG. 1 is a perspective view showing the keypad face of the test set, FIG. 2 is a perspective view showing the battery cover portion of the test set, FIG. 3 is a perspective view showing the battery compartment portion of a main housing section of the test set, FIG. 4 is a perspective view of the battery door, FIG. 5 is partial perspective view showing the battery compartment portion of a main housing section of the test set, FIG. 6 is an enlarged partial perspective view of FIG. 3, and FIG. 7 is a perspective view showing the interior surfaces of the battery door and the battery compartment portion of a multi-section rear housing portion of the test set.

As shown in one or more of the various FIGS. 1–7, the craftsperson's test set of the present example comprises a multi-section rear housing portion 20 and a front housing portion 30. The rear housing portion 20 has a first top end 21, to which a craftsperson's belt clip 22 is attached, and a second or bottom end 23 having a communication cord access port 24. The front housing portion 30 has a front face 31 containing a keypad 32, a receiver grill 33 and a microphone grill 34, while an end portion thereof contains a speaker grille 35.

The multi-section rear housing portion 20 has a main housing section 25, and a battery compartment cover section or door 26, which is conformal with and completes the exterior housing surface of the rear housing portion. The main housing section 25 is configured to mate with the front housing portion 30, and has a battery compartment 40. The battery compartment 40 is closed along a peripheral portion 41 of the battery door 26, by means of respective ridge regions 27 and 28 of the battery door 26 which are removably engageable with respective grooves 47 and 48 of the main housing section.

The battery compartment 40 is sized to accommodate a plurality of batteries 50 (e.g., four, as a non-limiting number) at a first portion 60 thereof, and a printed wiring board 70 at a second portion 80 adjacent to the first portion 60. For this purpose, the first portion 60 of battery compartment 40 contains a fixed battery contact wall 61 disposed adjacent to a pair of land portions 62 and 63 at a first end 64 of the battery compartment 40. Land portions 62 and 63 have respective circular recesses 65 and 66, which are configured to mate with respective cylindrical stand-offs 95 and 96 that are molded into interior surface 91 of the battery door 26. Similarly, a sloped land portion 67 has circular recesses 68 and 69, which are configured to mate with respective cylindrical stand-offs 98 and 99.

In order to accommodate a line cord attachment fixture, shown generally at 100, and described in the above-referenced coincidentally filed Zoiss et al application, entitled "Line Cord Attachment for Telephone Test Set," land portions 62 and 63 are spaced apart from one another. Also, the fixed battery contact wall 61 has a gap 71 corresponding to the spacing between the land portions 62 and 63. This separation allows a line cord captured by the line cord attachment fixture 100 to pass through the fixed battery contact wall 61 to the second portion 80 of the battery compartment containing the printed wiring board 70.

The fixed battery contact wall 61 has a plurality of battery contacts (four in the example shown, at 81, 82, 83 and 84) that are arranged to engage first terminals 101, 102, 103 and 104 of respective batteries 111, 112, 113 and 114. Although the Figures show batteries 111 and 112 being longer than batteries 113 and 114, in reality, it is to be understood that each of the four installed batteries is of the same length. The longer batteries 111 and 112 correspond to rechargeable batteries, such as size 1½ AA NiCad batteries, while the shorter batteries 113 and 114 correspond to non-rechargeable batteries, such as size AA alkaline batteries, as non-limiting examples. Differential length batteries are shown simply for purposes of using the same figure to illustrate two alternative battery types in the variable geometry compartment.

The battery compartment 40 further includes a moveable battery contact wall 120, which is selectively positionable at different locations 117, 118 that are spaced apart from the fixed wall 61 by respectively different distances associated with dimensions of different sized batteries 111/112 and 113/114. Like the fixed battery contact wall 61, the moveable battery contact wall 120 contains a plurality of battery contacts 121, 122, 123 and 124 that are arranged to engage second terminals 131, 132, 133 and 124 of the batteries 111, 112, 113 and 114.

For this purpose, a plurality (two pairs in the illustrated example) of receptacles 141, 142, 143 and 144 are disposed at the spaced apart locations of the battery compartment 40. The receptacles 141–144 are configured as standoffs molded into the main housing section 25, and having respective slots 151, 152, 153 and 154 that are sized to capture opposite ends 125 and 126 of the moveable battery contact wall 120. To securely retain the moveable contact wall 120 in either of its two installed positions (either between receptacle pair 141/142 or between receptacle pair 143/144), the interior surface 91 of the battery door 26 contains a pair of molded channels 93 and 94, which are sized to receive a top edge portion 135 of the moveable contact wall 120.

In the illustrated example, to accommodate longer-sized batteries, corresponding to the lengths of batteries 111 and 112, the moveable battery contact wall 120 is captured by receptacles 141 and 142, which are farther apart from the fixed contact wall 61 than are receptacles 143 and 144. To accommodate shorter-sized batteries, corresponding to the lengths of batteries 113 and 114, the moveable battery contact wall 120 is captured by receptacles 143 and 144, which are closer to the fixed contact wall 61 than are receptacles 141 and 142. The interior surface 91 of the battery door 26 also contains a plurality of circularly grooved ribs 97 which are sized and located to retain the batteries 111–114 in their installed positions between the fixed battery contact wall 61 and the moveable battery contact wall 120. As further shown in FIG. 7, the interior surface 91 of the test set's battery door 26 includes a plurality of (3) spaced apart projecting posts 185, 186, and 187. These posts are located between the cylindrical stand-offs 95 and 96, and the plurality of circularly grooved ribs 97 that retain the batteries in their installed positions. As such, posts 185, 186 and 187 pass into associated spaces 85, 86 and 87, respectively, between adjacent pairs of battery contacts 81/82, 82/83 and 83/84 in the main housing section 25, shown in FIG. 6, when the battery door 26 is closed onto the main housing section 25.

A power connection to the internal circuitry of the test set is provided by way of a flexible battery cable 150, which is connected between the battery contacts 121, 122, 123 and 124 of the moveable battery contact wall and a power supply terminal pad 151 on the printed wiring board 70. The use of a flexible battery cable 150 serves to accommodate the different locations at which the moveable wall 120 is positionable and serves as a lanyard to keep the moveable wall from falling out in the course of changing a battery.

In order to permit line cord to extend through the fixed battery contact wall 61 to the second portion 80 of the battery compartment containing the printed wiring board 70, the moveable wall 120 further includes a slot 128 at a lower portion thereof. The line cord is terminated at a pair of RJ 45 telephone jacks 75 and 76 mounted on printed wiring board. The moveable wall 120 also includes a battery charging switch 160 attached to a rear wall surface 129. Switch 160 has a spring-biased plunger 161, which is engaged and thus operated by a boss 163 molded into the interior surface 91 of the test set's battery door 26, when the moveable wall 120 is installed in receptacles 141 and 142 associated with the longer (rechargeable) batteries. When the charging switch 160 is thus operated, it closes a charging path between a charging unit receptacle 170 mounted on the printed wiring board 70 and ported to the exterior of the test set housing and the contacts of the moveable wall 120, thereby allowing the batteries to be charged.

When the moveable wall 120 is installed in receptacles 143 and 144 associated with the shorter (non-rechargeable) batteries, the plunger 161 of charging switch 160 is no longer positioned to be engaged and operated by boss 163 of the interior surface of the test set's battery door 26. As a consequence, no charging path is provided through the charging switch 160, so that a charging voltage from an external charging unit plugged into receptacle 170 will not be applied to the contacts of the moveable wall 120, and the shorter non-rechargeable batteries engaged thereby. Namely, changing the position of the moveable wall 120 from the position shown to that associated with receptacles 143 and 144, associated with the shorter, non-rechargeable batteries, will automatically relocate the charging switch 160 so that it cannot be engaged by the boss, thereby preventing the shorter non-rechargeable batteries being placed in circuit with the battery charger.

As will be appreciated from the foregoing description, the inability of conventional battery compartments of electronic and electrical communication devices, such as a telephone test set, to accommodate different sized batteries is successfully remedied by the variable geometry battery compartment of the present invention, which is easily mechanically reconfigurable by the user, so as to allow different sized batteries to be used to power the circuitry of the device. As pointed out above, a moveable battery contact wall is readily repositionable between different spaced apart locations relative to a fixed wall. Further, since a charging switch, which controls the establishment of a charging path for rechargeable batteries, can only be engaged when the moveable wall is positioned to accommodate longer sized rechargeable batteries, changing the position of the moveable wall to accommodate shorter, non-rechargeable batteries, will prevent the charging switch from being engaged by the boss in the cover, so that shorter non-rechargeable batteries cannot be placed in circuit with a battery charger.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. A battery compartment for a utility device comprising a main housing section having a battery compartment, which is closed by a battery compartment cover therefor, said battery compartment being sized to accommodate plural sets of batteries of respectively different lengths adjacent to a printed wiring board, said printed wiring board including a battery charging receptacle that is ported to the exterior of said utility device for providing a charging path for rechargeable batteries installed in said battery compartment, a first end of said battery compartment having a first plurality of spaced apart fixed battery contacts that engage first terminals of respective batteries of a set of batteries installed parallel to one another in said battery compartment, a second end of said compartment having a moveable wall, which is selectively positionable at different separation distances from said first end of said battery compartment to accommodate different length battery sets, said moveable wall containing a second plurality of spaced apart battery contacts that engage second terminals of said batteries, and are connected to a power supply terminal of said printed wiring board, and a battery charging switch affixed with said moveable wall, so that said battery charging switch is engaged by a battery charging switch-operating element of an interior surface of said battery compartment cover, and places said battery charging receptacle in circuit with rechargeable batteries installed in said battery compartment, when said moveable wall is installed at a first position of said battery compartment, separated from said first end of said battery compartment by a first distance associated with the length of a rechargeable battery set, and so that said battery charging switch is not engaged by said battery charging switch-operating element, when said moveable wall is installed at second position of said battery compartment, separated from said first end of said battery compartment by a second distance, different from said first distance, associated with the length of a non-rechargeable battery set.

2. A battery compartment for a utility device according to claim 1, wherein said battery charging switch-operating element of an interior surface of said battery compartment cover comprises a boss that is configured to engage a plunger of said charging switch and place said battery charging receptacle in circuit with rechargeable batteries installed in said battery compartment, only when said moveable wall is installed at said first position of said battery compartment.

3. A battery compartment for a utility device according to claim 1, wherein said interior surface of said battery compartment cover has a plurality of spaced apart posts projecting therefrom and arranged to pass between adjacent ones of pairs of said first plurality of spaced apart fixed battery contacts at said first end of said battery compartment, when said battery compartment cover closes said main housing section.

4. A battery compartment for a utility device according to claim 1, wherein said utility device comprises a telephone test set.

* * * * *